United States Patent [19]
Cox, Jr. et al.

[11] Patent Number: 6,104,398
[45] Date of Patent: Aug. 15, 2000

[54] FAST AND EFFICIENT MEANS FOR GROUPED OBJECT SELECTION AND DESELECTION

[75] Inventors: Patrick Herbert Cox, Jr., Raleigh; Jeanne Leahy Murray, Durham; David J. Schell, Raleigh, all of N.C.

[73] Assignee: International Business Machines Corporation, Armonk, N.Y.

[21] Appl. No.: 09/023,474

[22] Filed: Feb. 13, 1998

[51] Int. Cl.⁷ ...................................................... G06F 13/00
[52] U.S. Cl. ........................... 345/352; 345/348; 345/356
[58] Field of Search .................................... 345/345, 346, 345/356, 357, 348, 349, 350, 351, 352, 353, 354, 974, 962, 973; 705/7, 8, 9

[56] References Cited

U.S. PATENT DOCUMENTS

| 4,712,191 | 12/1987 | Penna | 345/356 |
|---|---|---|---|
| 5,615,347 | 3/1997 | Davis et al. | 345/349 |
| 5,838,325 | 11/1998 | Deen et al. | 345/353 |
| 5,877,760 | 3/1999 | Onda et al. | 345/341 |
| 5,959,627 | 9/1999 | Duwaer et al. | 345/345 |

*Primary Examiner*—Matthew M. Kim
*Assistant Examiner*—Tadesse Hailu
*Attorney, Agent, or Firm*—Jeanine S. Ray-Yarletts; Marcia L. Doubet

[57] ABSTRACT

A technique, system, and computer program for quickly and efficiently selecting or deselecting a spatially-related group of objects using a single selection or deselection operation, while preserving the ability to select or deselect individual items within a group or subgroup. A new set of graphical control objects is defined, any of which will graphically indicate the members of the group with which it is associated without requiring a textual explanation. Alternatively, a control object such as a slider bar may be used, where the technique of controlling the selection status of the group is defined for the slider bar in a novel manner.

36 Claims, 7 Drawing Sheets

FIG. 6
FIG. 6A
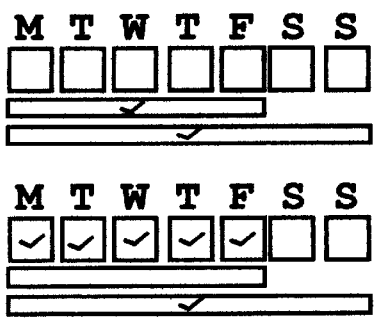
FIG. 6B
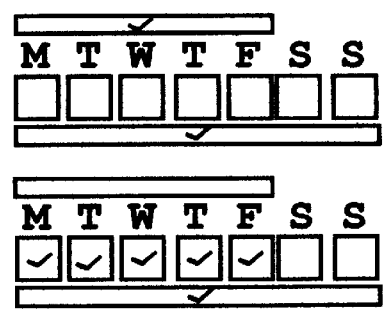
FIG. 6C
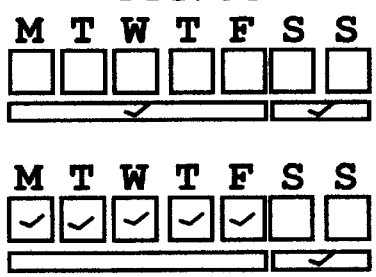
FIG. 6D
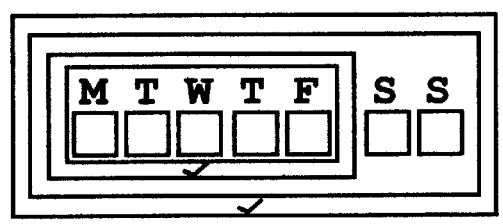
FIG. 6E
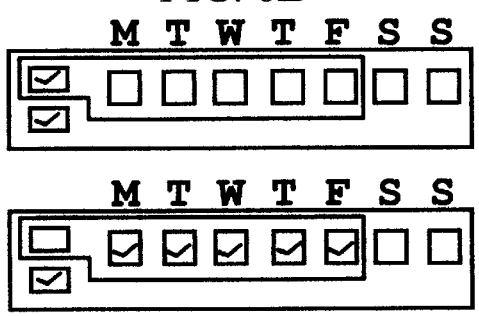
FIG. 6F
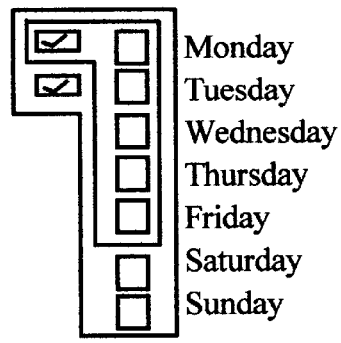
FIG. 6G
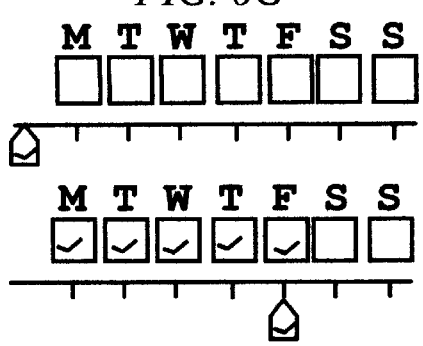
FIG. 6H
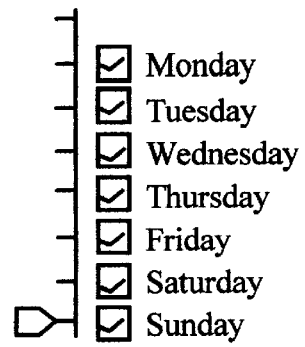

FAST AND EFFICIENT MEANS FOR GROUPED OBJECT SELECTION AND DESELECTION

BACKGROUND OF THE INVENTION

1. Field of the Invention

The present invention relates to a graphical user interface, and deals more particularly with a method and apparatus for quickly and efficiently selecting or deselecting a spatially-related group of objects using a single selection or deselection operation, while preserving the ability to select or deselect individual items within a group. A new set of graphical control objects is defined, any of which will graphically indicate the members of the group with which it is associated.

2. Description of the Related Art

Computer users have become accustomed to using computer software applications which present information through a graphical user interface. A number of types of information presentation have become de facto standards, such as radio buttons, checkboxes, slider bars, and pushbuttons. These items are referred to as graphical user interface objects, or graphical objects. Users typically interact with software applications having a graphical user interface by moving a pointing cursor over a graphical object using, for example, a mouse or similar pointing device such as a light pen, and then indicating (for example, by clicking a mouse button or pressing the light pen) that the object should be selected. Alternatively, some graphical user interfaces may be presented on a touch-sensitive display screen. In that situation, the user interacts with the software application by touching the graphical object he wishes to select.

The programmer writing a software application having a graphical user interface defines the physical layout of the graphical objects on the user interface screen, as well as the functioning of the objects and any logical relationships among those objects. The function represented by a graphical object can be as simple as setting the value of a variable used by the software application, or it can represent a more complex function such as initiating the execution of a software subroutine, or any other function desired by the programmer.

When radio buttons and checkboxes are displayed on the screen, they are normally accompanied by text, which explains the function of the individual object. Each of these objects has a status associated with it, which is either "selected" or "not selected". The face of the radio button or checkbox represents graphically to the user what the current status for that object's function is. For example, a radio button is represented as a round graphical object. When the radio button is selected by the user, it is typically shown having a black circle that is smaller than the radio button, and located inside the larger button. When the radio button is deselected, it is shown as just the round object without the black circle inside. A checkbox is represented by a square graphical object that resembles an empty box. When the checkbox is selected by the user, a check mark (or perhaps an "x") is shown in the square box, as if a person had written a check mark into a box with a pencil. When the checkbox is deselected, the check mark does not appear, so that the checkbox appears as the empty square. While selection and deselection have been described here as a status set in response to a user interaction, it will be obvious to one skilled in the art that the default selection status of each object, as defined by the software application, will be represented in the same graphical manner.

By convention, rules are associated with the selection of radio buttons and checkboxes. Radio buttons have the characteristic of mutual exclusion. That is, of all the radio buttons in a logically-defined group, only one can be selected at a time: if one radio button is already selected when the user selects a different radio button from the group, then the originally-selected button is automatically deselected. Checkboxes, on the other hand, are not mutually exclusive. They function as multiple-choice selectors within a logically-defined group, so that any number of the checkboxes in the group can be selected at one time.

"Pushbutton" is a term used for a graphical object that may or may not be shaped like a round button: it may be shaped like a rectangle, square, etc. The function typically associated with a pushbutton object is to cause some action to occur, or to select a particular response from among choices presented. As an example of the first scenario, a pushbutton may be displayed as a rectangle with the word "Go" on its face. When the user clicks on this pushbutton, some predefined action is executed. The particular action may be obvious to the user, or may be explained with text accompanying the pushbutton. As an example of using a pushbutton to select a response, pushbuttons may be used in an error situation, where an error message is displayed to the user along with two pushbuttons having the text "Retry" and "Cancel" on their faces. The user then decides whether he wants to retry the function encountering the error, or to cancel the function entirely. He indicates his choice from the alternatives by clicking on the pushbutton with the corresponding text.

A slider bar is a type of graphical user interface object which is often associated with a function that has values within a range or scale, where the corresponding values can be graphically represented as having a logical sequential order. To use a slider bar, the user drags an object representing a slider (or pointing object), which is positioned on the bar. Dragging the slider causes a different value to be selected from the range. Alternatively, the user may click directly on a portion of the bar, to select a specific value. As an example, a slider bar might be used on the user interface of a multi-media computer application having sound. The user would select the desired sound volume by moving the slider from a low value to a high value, or somewhere in between. When a specific value, such as a number, corresponds to a position in the range, the application will typically display the number that has been selected. By moving the slider, and having the number change at the same time, the slider bar gives the appearance of representing a scale.

A limited amount of space is available on the display screen for presenting graphical objects and any corresponding text that may be required in order to explain the function of each object. The more choices that are available in a particular software application, the greater will be the number of graphical objects needed to represent those choices.

Programmers tend to physically group graphical objects that have some relationship, and often will define logical groups of objects as well. For example, radio buttons are defined as forming a logical group, in order to implement the mutual exclusion property for the group. The checkboxes belonging to a group will normally be located together on the display, according to their logical grouping. These logical groups of objects may be further divided into subgroups, which are groups within groups. (The concepts of the present invention apply equally to logically-defined groups and to their logically-defined subgroups. Thus, the term "group" should be construed as including subgroups hereinafter unless otherwise indicated.)

In spite of these physical and logical groupings of objects, there is currently no mechanism for quickly and efficiently selecting (or deselecting) all the graphical objects of a group with a single operation, while preserving the ability to select (or deselect) individual items within the group. Each object must be accessed, one at a time, to change its selection status. This can be very time-consuming, as well as tedious, for a user of the software application. It would be much more convenient for the user to be able to indicate, for example with a single click of a mouse button, that he would like to select or deselect an entire group of objects.

Existing software applications may present a type of group-controlling mechanism through use of a separate button or object designated, for example, "select all". However, this type of object, with its corresponding textual explanation, occupies extra screen space on the display, and does not visibly indicate its associated group members using a spatial relationship. Further, a "select all" function is typically associated with a different type of user interface control, where a single pushbutton is provided to select all items in a multi-entry list, and where the function and the corresponding pushbutton are not associated with any logical subgroup of those items. What is needed is a solution that does not require extra text to explain the functioning of the control object, but which visibly indicates which objects it controls by the relative positioning of the control object and the group member objects, and which allows selection (or deselection) of a logical group of graphical objects with a single operation. The user should be able to select or deselect individual graphical objects as well, to allow maximum flexibility in object selection.

The present invention would be useful in any situation where the user is presented with a group or list of multiple-choice items from which to make selections, such as in on-line shopping software applications. In an on-line shopping application, the shopper may be presented with a list of items available for purchasing, and be directed to select objects associated with each item that he wishes to order electronically. The items may be logically grouped as packages, such as an options package when ordering an automobile. Today, the on-line shopper has to click on each individual option in the package to order all the options of the package.

Another scenario where selecting or deselecting items as a group would be useful is any type of calendaring or scheduling software where repetitive scheduling of events or actions is possible. The user of this type of application, in order to schedule an event of some sort, might be presented with a list of the days of the week, or days of the month, or even hours of the day. Logical groupings where days are involved might be weekdays as one group, and weekends as another group, depending on the particular software application in use. Logical groupings of hours might be the a.m. hours as one group, and the p.m. hours as another group; or, for example, a factory-scheduling application might group the hours of the day into first shift, second shift, and third shift. The particular logical groups will have been defined by the programmer creating the software application, as discussed earlier. A user of this type of application would find it much more convenient to be able to select all weekdays, or all first shift hours, with a single mouse click rather than individually clicking on an object corresponding to each weekday or each of eight hours.

Accordingly, a need exists for a technique by which a user of a software application having a graphical user interface can quickly and efficiently select or deselect all the members of a logically-defined group of graphical user interface objects, while still preserving the ability to select or deselect individual items within the group. Further, a need exists for a new type of graphical object that will control the selection status of a group of other graphical objects, and which indicates, by its position and appearance, the graphical objects belonging to the group. The proposed technique provides a number of new graphical control objects, which the programmer can position on the display in a spatial relationship to members of a group of other graphical objects. The programmer defines the group members associated with this control object, and defines the function of the control object as controlling the selection status of the member objects. Optionally, the existing slider bar graphical object can be used instead of a new control object, where the technique of controlling the selection status of associated objects is defined for the slider bar in a novel manner. The present invention supports subgrouping, whereby a group within another group can be defined, and whereby a graphical control object is associated with each level of logical group so that the user can select or deselect members at the level of granularity most convenient. Because the graphical control objects indicate their function by their position and spatial relationship to the group members, there is no need to include text for the control object: thus, the control object occupies a minimal amount of display space.

SUMMARY OF THE INVENTION

An object of the present invention is to provide a technique whereby a user of a software application having a graphical user interface can quickly and efficiently select or deselect all the members of a logically-defined group of graphical user interface objects, while preserving the ability to select or deselect individual items within a group.

Another object of the present invention is to provide a number of new graphical control objects, any of which will control the selection status of a group of other graphical objects, and which indicates, by its position and appearance, the graphical objects belonging to the group. The programmer positions the graphical control object on the display in a spatial relationship to members of a group of other graphical objects, and defines the graphical control object as associated with, and controlling the selection status of, those objects.

Still another object of the present invention is to provide a technique whereby the existing slider bar graphical object can be used instead of a new graphical control object, where the technique of controlling the selection status of group members is defined for the slider bar in a novel manner.

Yet another object of the present invention is to accomplish the afore-mentioned benefits without requiring additional text on the display, thereby conserving display screen space.

A further object of the present invention is to provide a technique that supports subgrouping, whereby a group within another group can be defined, and whereby a graphical control object is associated with each level of group (that is, a control object for a group, and a separate control object for each subgroup), so that the user can select or deselect members at the level of granularity most convenient.

Other objects and advantages of the present invention will be set forth in part in the description and in the drawings which follow and, in part, will be obvious from the description or may be learned by practice of the invention.

The present invention will now be described with reference to the following drawings, in which like reference numbers denote the same element throughout.

BRIEF DESCRIPTION OF THE DRAWINGS

FIGS. 6A–6H illustrates various manners in which the graphical control objects used by the present invention may be depicted on a graphical user interface display of a computer workstation.

DESCRIPTION OF THE PREFERRED EMBODIMENT

Figure 1:
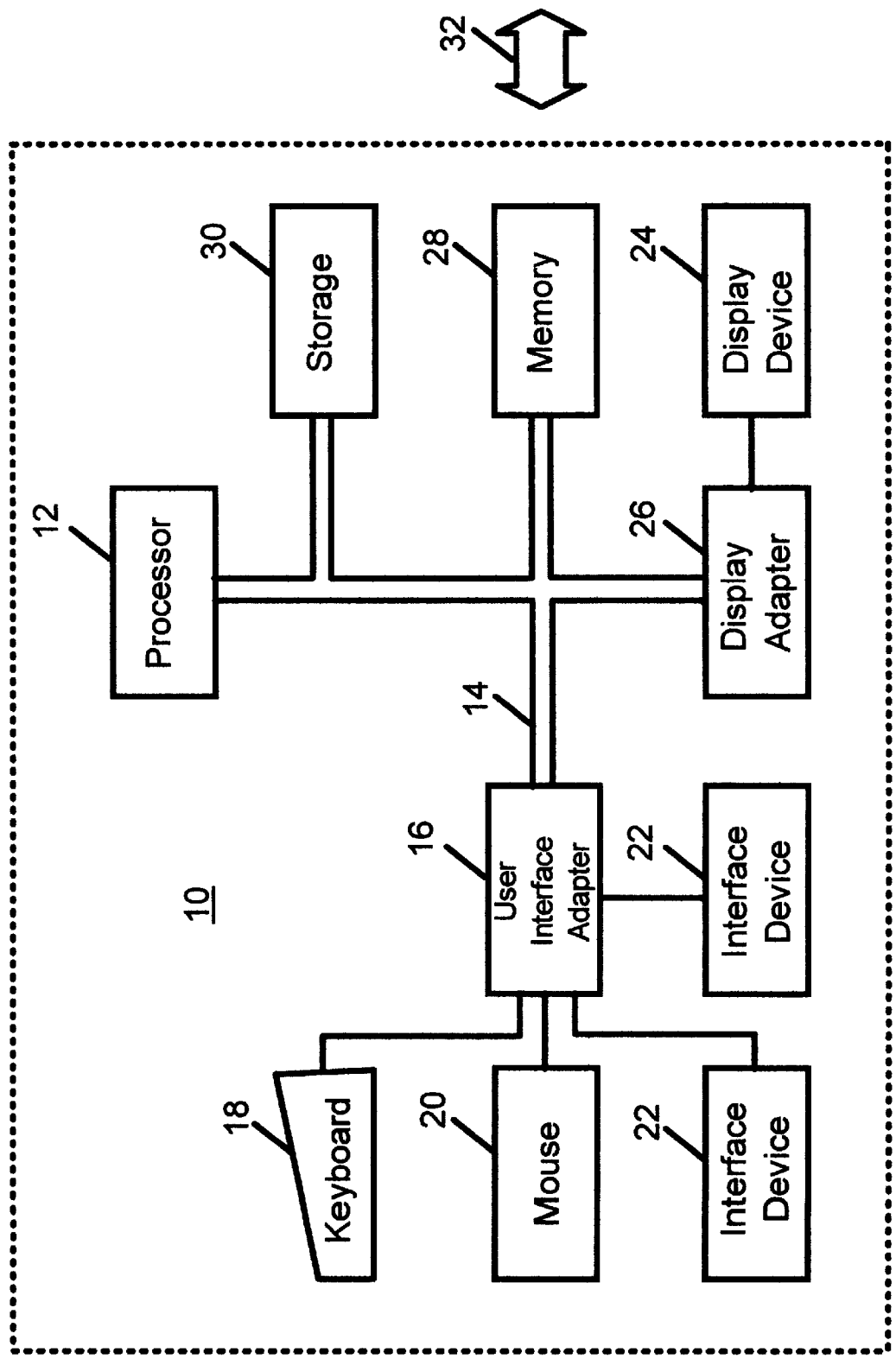
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, the workstation 10 can be a client in a client/server arrangement with another computer, it may be a standalone computer not connected in a network, etc. All of these configurations, as well as the appropriate communications hardware and software, are known in the art.

Figure 2:
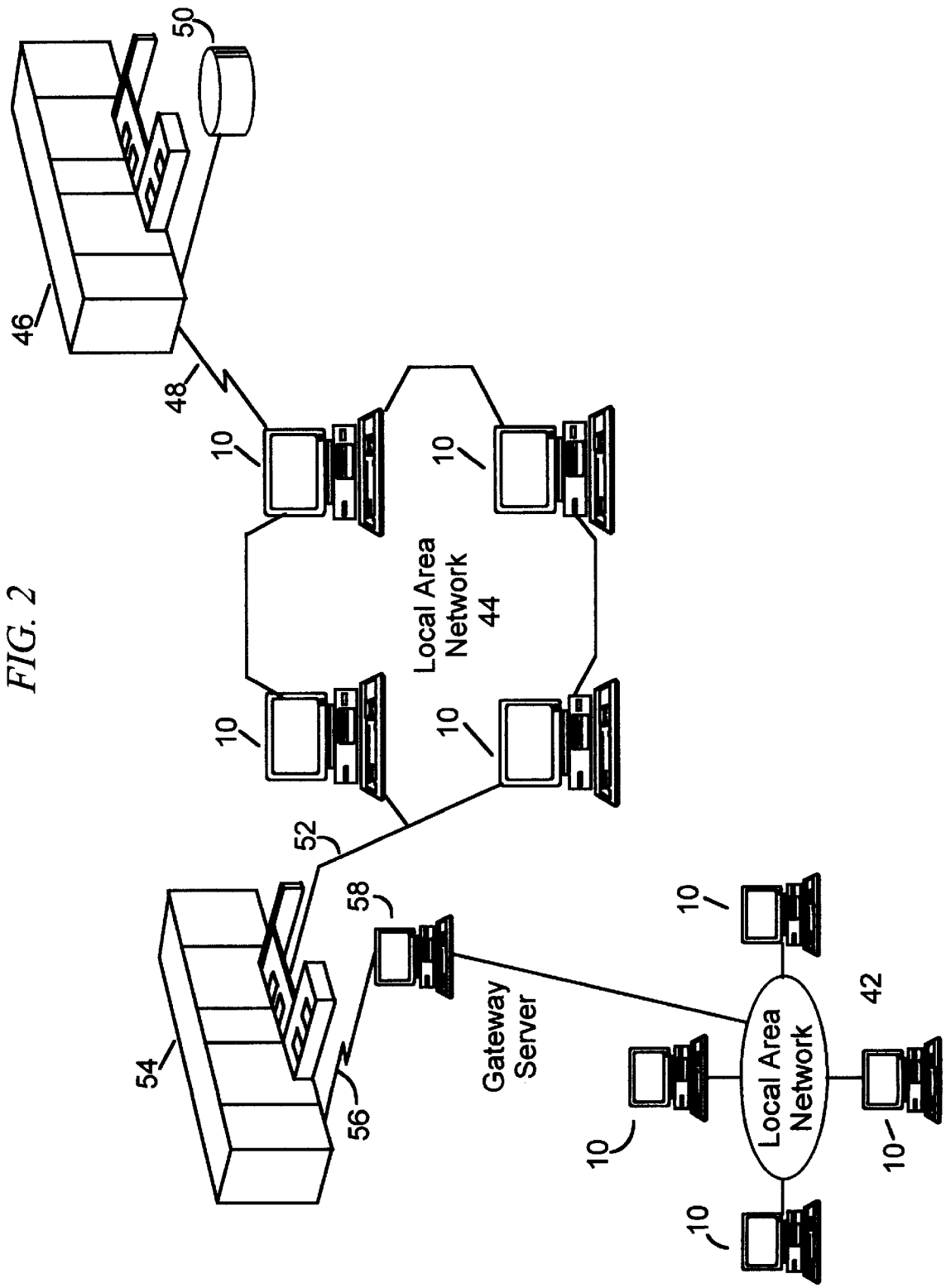
FIG. 2 is a diagram of a networked computing environment in which the present invention may be practiced.

FIG.2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The graphical objects resulting from use of the present invention may be displayed on any of the various display devices 24, and accessed using any type of interface device such as a keyboard 18, mouse 20, and/or other interface devices 22 (including any user interface device, such as a touch sensitive screen, digitized entry pad, etc.).

The preferred embodiment of the present invention will now be discussed with reference to FIGS. 3 through 6.

In the preferred embodiment, the present invention is implemented as a computer software program. The implementation of the invention may be used with any software application that has a graphical user interface, and which presents graphical objects to the user on a graphical user interface display to allow the user to select one or more such objects. The application may execute entirely on the user's computer, as a stand-alone software package, or it may execute partly on the user's computer and partly on a remote computer. In the latter scenario, the remote computer may be connected to the user's computer through a LAN or a WAN that is part of a network owned or managed internally to the user's company, or the connection may be made to an external computer (for example, through the Internet using an Internet Service Provider).

The present invention is useful where the software application presents graphical objects representing multiple choice selections, which selections have been physically and logically grouped by the programmer writing the software application. These groups may be further divided into subgroups, whereby one group is a member of another group. The graphical object used for the multiple choice selection items may be a checkbox, or it may be some other type of graphical object used to represent the function described herein as being associated with a checkbox. For ease of description, this object is referred to hereinafter as a checkbox.

The present invention allows the programmer to define a graphical control object that will control the selection status of a group of other graphical objects, and which indicates, by its position and appearance, the graphical objects belonging to that group. In the preferred embodiment, this new graphical object is referred to as a "check bar", which the programmer can position on the display in a spatial relationship to members of a group of other graphical objects. The check bar is preferably rectangular in shape, and is placed on the display alongside graphical objects representing associated group members, where the bar extends from the first group member to the last group member. The check bar and group members may be positioned in a horizontal alignment, as shown in FIG. 6A, or in a vertical alignment, as shown in FIG. 6F. Alternatively, the check bar and group members may be placed in other arrangements such as a diagonal alignment (not shown), without deviating from the inventive concepts of the present invention. Optionally, the face of the check bar object may have a check mark displayed on it, to remind the user of the software application that this object is a check bar and that its function is to select or deselect associated group objects (that is, the checkboxes which are members of the group).

The user of a software application having a graphical control object such as a check bar can quickly and efficiently select or deselect all the members of the logically-defined group of other graphical user interface objects associated with the check bar, by clicking on the check bar using a mouse or pressing the check bar on a touch-sensitive screen, etc. If the status of the group was "not selected" before the user clicks on the check bar, the status of each group member will change to "selected" once the check bar is clicked. The face of the checkbox for each group member will then be shown with a check mark (equivalently, an "x") in the checkbox, to indicate this status. At that point, if the user wishes, he can deselect the entire group by clicking on the check bar again, or he can deselect individual members of the group by clicking on their associated checkbox.

Note that if the status of the group members varies before the user clicks on the check bar (that is, some members are selected and some are not selected), clicking on the check bar acts to force all members to the same status. That status will be the opposite of what the group selection status had been before the check bar was clicked on.

Note also that clicking on an individual group member does not normally change the group selection status: it changes only the selection status of that individual group member. If, however, this individual change results in all group members having a selection status which is the opposite of the associated group selection status, then an optional feature of the preferred embodiment of the present invention changes the group selection status, to align it with the selection status of the members. As an example, suppose that the group selection status is "not selected", but that the user individually selects each group member, so that the group members all have the individual status "selected" and all have a check mark in their checkbox. If the user now clicks on the graphical control object for this group, he expects all the check marks to be removed. In order for this expected behavior to occur, this optional feature of the preferred embodiment includes logic to detect whether the group selection status is out of alignment with the selection status of the group members, and to correct it when necessary.

When a logical subgroup of a group of objects is defined, a check bar (or other graphical control object) is associated with each level of grouping, according to the present invention. In FIG. 6A, for example, the seven days of the week represent one group, and the five weekdays represent another group which is a subgroup of the larger group. The two weekend days do not belong to a separate group (although the programmer might have chosen to define one, in which case a small bar would appear alongside them, as in FIG. 6C). A large check bar is placed alongside all seven of the objects in the larger group, and a smaller check bar is placed alongside all of the objects in the smaller weekday subgroup. This spatial representation visually indicates to the user how the objects have been logically grouped, and therefore which individual objects (here, either the group consisting of seven days, or the subgroup consisting of the weekdays) will be selected or deselected if the associated check bar is clicked on. Alternatively, the check bars can be placed in different spatial relationships to the checkboxes, as shown in FIG. 6B where one check bar appears above the checkboxes, and another check bar appears below the checkboxes. This arrangement has the advantage of locating the check bars as closely as possible to the associated checkboxes. (While the subgroups shown here do not, when taken together, represent the entire group of objects of the larger group, it is equally likely that the programmer would define subgroups to account for every object from the largest collection.) By defining the objects as belonging to groups and possibly also belonging to subgroups, the user can select or deselect objects at the level of granularity most convenient.

When a graphical control object for a group containing subgroups is clicked on by the user, the present invention ensures that the group selection status of the subgroup is automatically aligned with that of the larger group. As an example, suppose the group shown in FIG. 6A as having seven members (the days of the week) has a group selection status "not selected", and the subgroup having five members (the week days) also has a group selection status "not selected". The seven checkboxes are all shown without check marks in this situation. If the user then clicks on the graphical control object for the seven-member group, the group selection status will be changed to "selected", and check marks will be placed in all seven check boxes. If the user next clicks on the graphical control object for the subgroup, he would expect the check marks to be removed from the corresponding five checkboxes. In order for this expected behavior to occur, it is necessary to force the selection status of all subgroups to the status of the group of which the subgroup is a member, whenever the user selects or deselects the larger group.

In an alternative embodiment, the graphical control object is not shaped as a rectangular bar. The object may have any geometric shape that serves to visibly indicate, through use of a spatial relationship, which objects are members of a particular group. FIG. 6D shows an example of a graphical control object which is shaped as a rectangular object having bars for sides, drawn around the objects belonging to the group it controls. FIGS. 6E and 6F show examples of multi-sided control objects, which again are drawn surrounding the objects belonging to the controlled group. These FIGS. 6D, 6E, and 6F also illustrate additional ways of graphically indicating logical subgroups. By showing one graphical control object as being drawn around the five weekdays, and another as being drawn around all seven days of the week, the weekdays are indicated as being a subgroup of the days-of-the-week group. The placement and appearance of the graphical control objects makes these relationships obvious, without requiring a textual explanation to accompany the control object.

FIGS. 6E and 6F further illustrate another option that may be used with any of the new graphical control objects defined for the present invention, and that is to have an additional graphical object associated with each group. This additional graphical object is illustrated in FIGS. 6E and 6F as a pushbutton with a check mark on it, although other representations could be used as well. The pushbutton does not appear in FIG. 6D, and therefore the user would select (or deselect) a group by clicking on any part of the associated graphical control object itself. The pushbutton does appear in FIGS. 6E and 6F, one for each level of group, and the user here would select (or deselect) a particular logical group by clicking on its corresponding pushbutton. In an alternative embodiment, both the pushbutton and the graphical control object would function as selection mechanisms, so that the user could select (or deselect) a group by clicking on either the pushbutton or the graphical control object. While use of the extra pushbutton does require additional space on the display, no text is required to indicate its function, so that the amount of space used is minimal.

Depending on the graphical control object being used in an embodiment of the present invention, it may be useful to indicate the current selection state of the corresponding group on the face of the control object itself. This is an optional feature of the preferred embodiment, whereby a check mark can be placed on the control object when clicking on the object will select all unchecked group members; the check mark does not appear on the control object when clicking on the object will deselect all checked group members. This is most useful when the selection status of the group members is mixed. Changing the face of the control object in this way serves as a visual reminder to the user as to what will happen if he clicks on the control object. Other ways of indicating this information visually with the graphical control object may also be used without deviating from the spirit of the present invention, such as displaying the control object in one color when clicking on the control object will select all unchecked group members, and displaying the control object in another color when it will deselect all checked members. FIG. 6A shows an example of indicating selection status on the face of a check bar. Here, no check mark appears on the check bar associated with the five-member group that is already selected, but a check mark does appear on the check bar associated with the seven-member group because some of its members have not yet been selected.

In yet another alternative embodiment, a graphical control object such as the existing slider bar can be used instead of a check bar, where the technique of controlling the selection status of group members is associated with the slider bar in a novel manner. This embodiment will typically be used where the associated graphical objects have some type of logical sequential order, as discussed previously. The programmer creating the software application can place a slider bar alongside a group of logically-related objects, as shown in FIGS. 6G and 6H, and can redefine the function of the slider bar. The present invention contemplates two techniques for selecting or deselecting checkboxes using a slider bar.

In the first technique, the user can drag the slider past a group of checkboxes, thereby selecting or deselecting the checkboxes which are spatially-related to those positions of the slider bar. FIG. 6G illustrates the effect of using a slider bar in this manner. In the upper part of FIG. 6G, the slider bar has not yet been dragged from its position at the left of the associated checkboxes, and no checkboxes are shown as having "selected" status. In the lower part of FIG. 6G, the slider bar has now been dragged from a position to the left of the checkbox for "Monday", to a position underneath the checkbox for "Friday". Thus, all checkboxes in the range between Monday and Friday show their selection status as "selected" by displaying a check mark in their checkbox. The user has set these five checkboxes to "selected" with a fast, efficient operation: the single operation of dragging the slider along the slider bar while pressing a selection button.

In the second technique, the user can click on a "hairline" (that is, a thin line, shown as going through the slider bar) associated with an individual check box. This serves to define a dynamically-created group, where the group members are all the checkboxes between the default slider position and the checkbox associated with the hairline. All the group members in this dynamically-created group now have the selection status "selected".

Note that there are no logical groups of objects predefined by the programmer using the slider bar control object. Instead, a logical group is defined dynamically as described above, as the user drags the slider or clicks on a hairline. A selection status is then applied to each individual object of this dynamic group. This is further discussed below with reference to FIG. 5.

Figure 3:
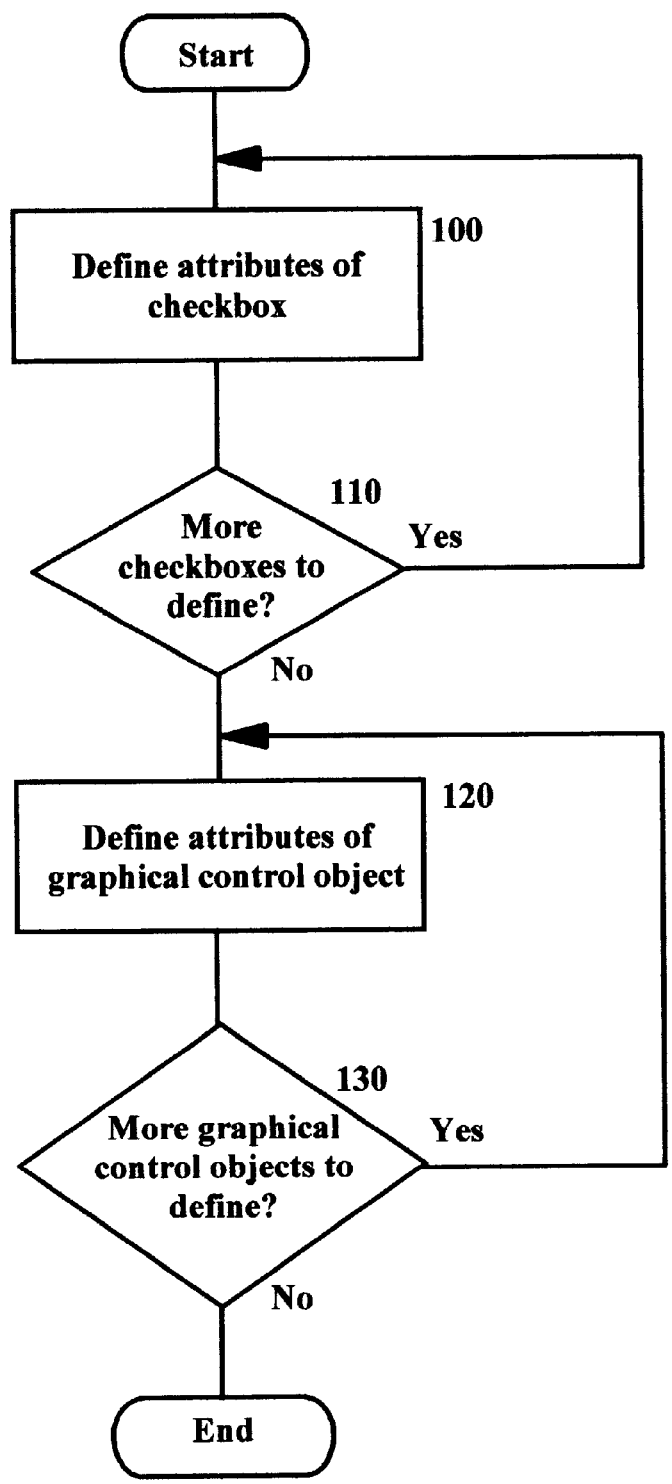
FIG. 3 illustrates a flow chart which sets forth the logic involved with the present invention when the graphical control objects, and the groups with which they are associated, are defined by a programmer creating a computer software application.

FIG. 3 illustrates the logical steps performed by a programmer creating a computer software application to define a graphical control object according to the present invention, to define the group of objects associated with that control object, and to define the functioning of the control object. (Graphical objects other than the graphical control objects of the present invention may be defined by the programmer, using objects and techniques that are known in the art. Definition of those objects which are not relevant to the present invention will not be discussed herein.)

The process begins at Step 100, where the programmer defines the attributes of a specific checkbox. Those attributes include, but are not limited to, the size of the box; the relative placement of the box on the display; the text accompanying the box; and the default selection status of the box (that is, "selected" or "not selected"). Other attributes may include checkbox color, text color, text font, etc. These other attributes are not relevant to the present invention, and will not be discussed in detail. Techniques for defining such attributes are well known in the art.

In addition to graphical attributes for each checkbox, each checkbox must have a corresponding variable defined in the software application, that stores its selection status. The software application uses these variable settings to determine what the user has selected when using the graphical user interface of the application. Use of the term "selection status" herein means both the graphical attribute (whether the checkbox has a check mark or not), and the variable setting.

At Step 110, a test is made to determine whether there are more checkboxes to be defined. If there are, the process at Step 100 will be repeated. Otherwise, control transfers to Step 120.

The attributes of a specific graphical control object are defined at Step 120.

For one of the new graphical control objects of the present invention (as shown in FIGS. 6A through 6F), these attributes include, but are not limited to: which other graphical objects are members of the associated group; what shape to use for the control object; where the control object is to be located on the display screen; and the default selection status of the associated group (that is, "selected" or "not selected"). When a subgroup is defined for a larger group, that subgroup must be indicated as a member of the larger group, so that clicking on the check bar associated with the larger group will apply the selection operation to the subgroup members as well as to those members of the larger group that are not subgroup members.

For the slider bar control object of the present invention (as shown in FIGS. 6G and 6H), these attributes include, but are not limited to: what shape to use for the slider; where the control slider bar is to be located on the display screen; the default position of the slider on the bar; and the direction of slider movement that corresponds to checkbox selection. Typically, for a slider bar aligned vertically as in FIG. 6H, the default slider position will be at the top of the slider bar, and therefore selection occurs by moving the slider downward; for a horizontal slider bar as in FIG. 6G, the default slider position, and therefore direction of movement for selection, will correspond to the direction in which text in the user's natural language is displayed for reading. As discussed earlier, logical groups are not predefined for slider bars by the programmer, so there is no group selection status or group membership to define at this point.

Step 130 asks whether there are more graphical control objects to define. If there are, the process at Step 120 will be repeated. Otherwise, definition of the graphical objects pertinent to the present invention is complete, and the process shown in FIG. 3 ends.

Figure 4A:
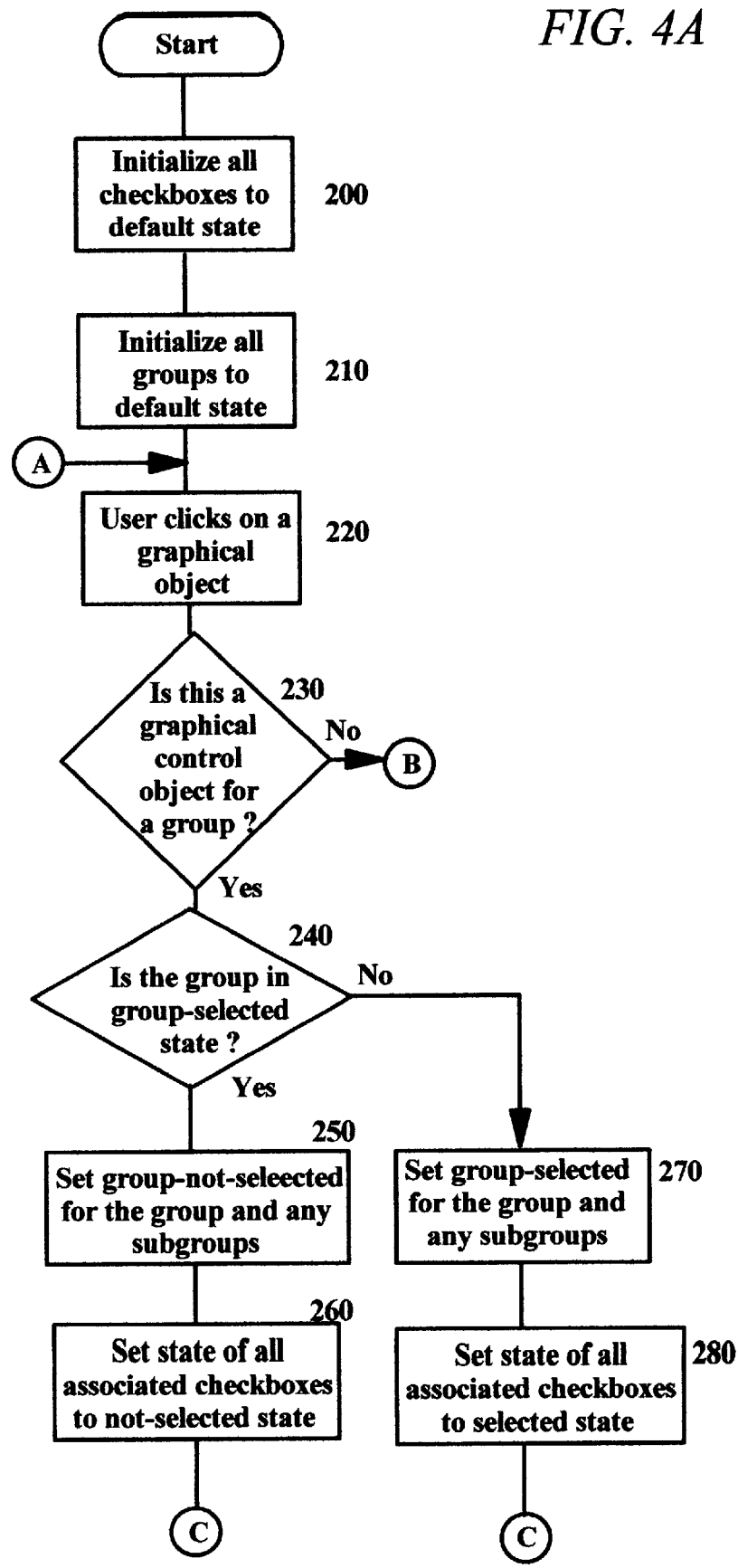
FIG. 4 illustrates a flow chart which sets forth the logic involved with the present invention when a graphical object is clicked on (or otherwise chosen) by the user.
Figure 4B:
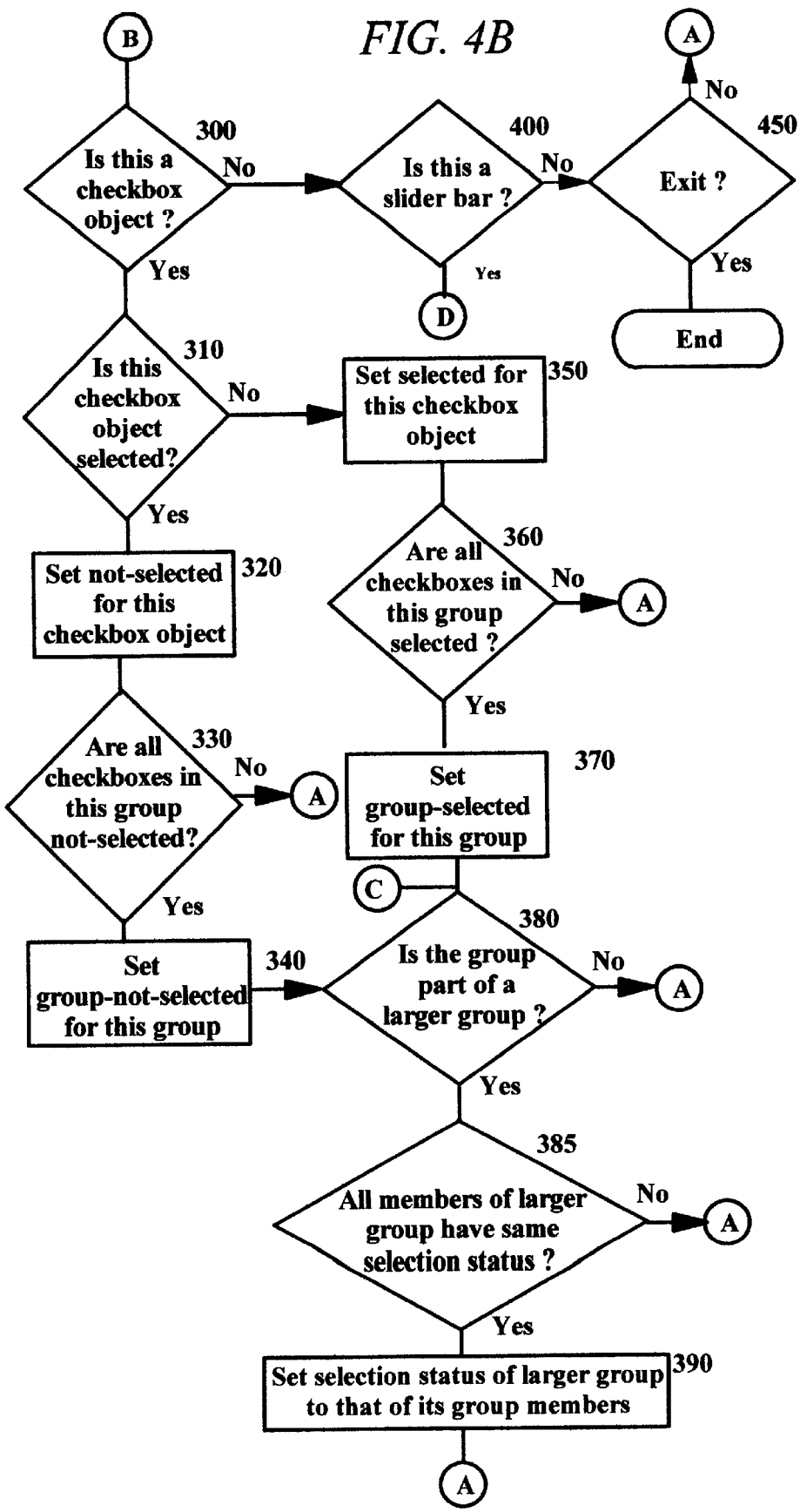
Figure 5:
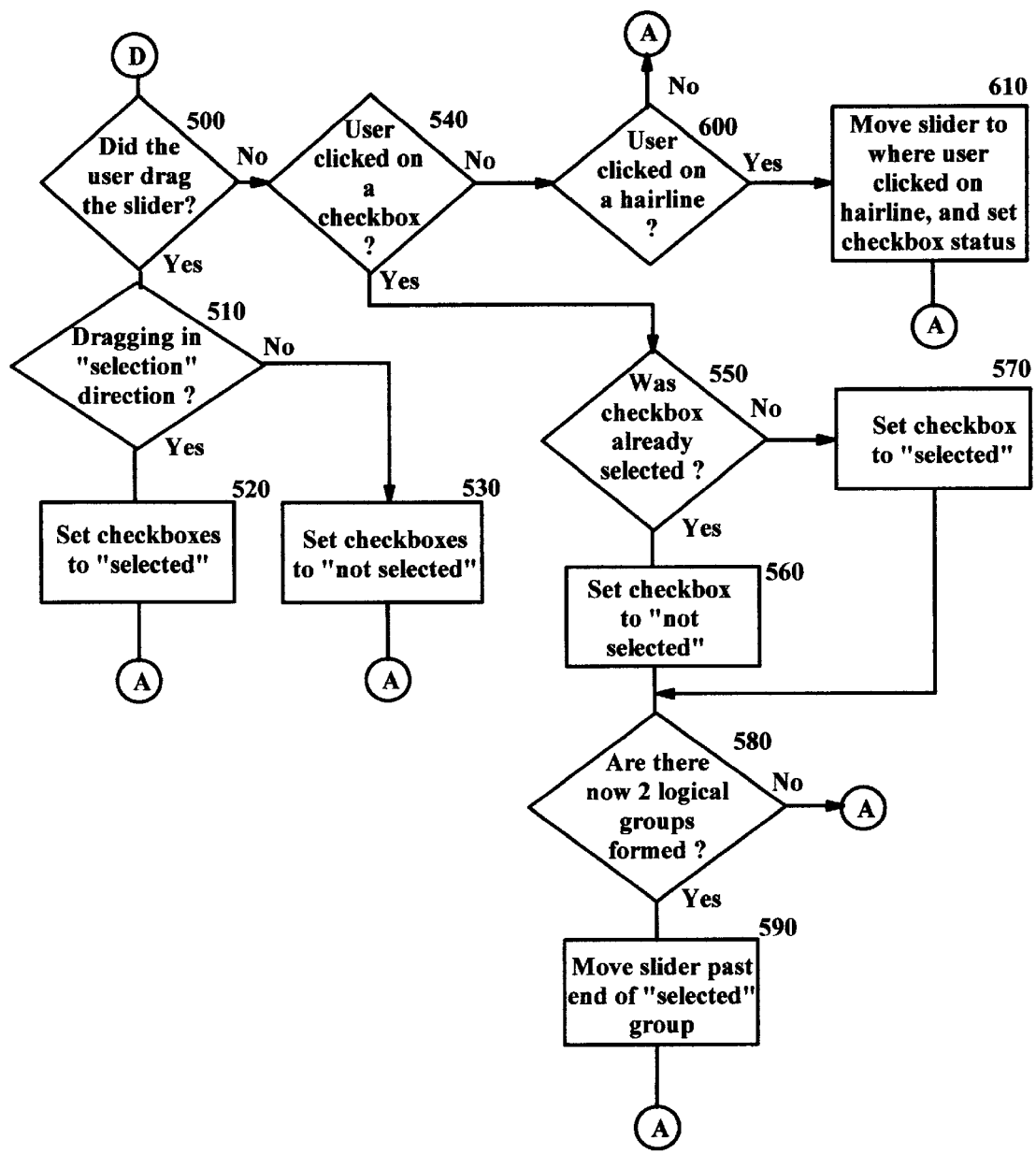
FIG. 5 illustrates a flow chart which sets forth the logic involved with the present invention when the slider bar graphical control object is used.

FIGS. 4 and 5 illustrate the logical steps performed by a computer software application embodying the present invention. These steps enable a user to take advantage of the fast, efficient selection and deselection technique, while still preserving the ability to select or deselect individual items. FIGS. 4 and 5 show only the logical steps pertinent to use of the graphical control objects of the present invention, and their group members: use of other graphical objects such as radio buttons does not form part of the present invention, and is not represented. It will be obvious to one skilled in the art how to incorporate the processes of FIGS. 4 and 5 into a larger process for handling general interactions with a graphical user interface.

The process of using the present invention begins at Step 200, where the selection status of all checkboxes is initialized to the default selection status defined by the programmer according to the process of FIG. 3. This enables the checkboxes initialized to "selected" status to be initially displayed with a check mark in the checkbox, and those initialized to "not selected" to be displayed without a check mark. (If no default object status has been set for the checkboxes, then "not selected" will be used as the default object status.)

At Step 210, the selection status of all logically-defined groups of graphical objects is initialized to the corresponding default group selection status. (If no default group status has been set, then "not selected" will be used as the default group status.) For implementations using a slider bar, there is no group selection status to initialize. The initialization done at this step is to position the slider at its default location on the slider bar.

Control reaches Step 220 when the user has chosen some graphical object from the display by clicking on that object (or otherwise indicating object choice). The comparisons made at Steps 230, 300, 400, and 450 inquire as to what object the user clicked on. Techniques for indicating what has been clicked on from a graphical user interface are well known in the art, and will not be described herein.

Step 230 asks if the user clicked on one of the new graphical control objects for a group (other than a slider bar). (As discussed above, the user may have clicked on a part of the graphical control object itself, or if an additional pushbutton was defined, may have clicked on this pushbutton.) If this test has a positive response, another test is made at Step 240. Step 240 asks what the existing selection state for this group is. If the group has already been selected, so that the status may be described by a term such as "group-selected", control transfers to Step 250; otherwise, control transfers to Step 270.

At Step 250, the group selection status is changed to "not selected". Note that the group selection status as defined for the present invention, as well as the status of the individual group members, has only two allowable values ("selected" or "not selected"). Thus, changing the status acts as a toggle switch, whereby its value reverses each time the corresponding object is clicked on.

Step 250 further indicates that the group selection status of any subgroups associated with this group is also changed to "not selected". This is done without regard to the existing selection status of the subgroups, to ensure that the subgroup selection and deselection operations function according to the user's expectations, as previously discussed with reference to FIG. 6A.

Step 260 then sets the status of each object that is a member of this group to "not selected". The graphical object corresponding to each group member will be changed on the display, to show the object without a check mark.

The process of using the present invention to select or deselect group members is now complete for this particular graphical control object, and control transfers to Step 380 to perform additional selection status alignment checking.

If control transferred to Step 270, then the group corresponding to the chosen control object had been in the "not-selected" state. Step 270 changes the group selection status to "selected", and also changes the group selection status of any subgroups associated with this group to "selected".

Step 280 then sets the selection status of each individual object that is a member of this group to "selected". The graphical object corresponding to each group member will be changed on the display, to show the object with a check mark.

The process of using the present invention to select or deselect group members is now complete for this particular graphical control object, and control transfers to Step 380 to perform additional selection status alignment checking.

If control reaches Step 300, then the graphical object clicked on by the user is not one of the new graphical control objects for a group. Step 300 asks whether the object clicked on is an individual checkbox graphical object, defined according to the present invention. If it is, then control transfers to Step 310; otherwise, control transfers to Step 400.

Step 310 asks if the graphical object's selection status is currently "selected". If so, then Step 320 changes that selection status to "not selected", and changes the graphical representation of the object on the display, to not show a check mark. Otherwise, Step 350 changes that selection status to "selected", and changes the graphical representation of the object on the display, to show a check mark.

After Step 320 or Step 350 has completed, the process of using the present invention to select or deselect an individual group member is complete. As an optional feature, the preferred embodiment provides further logic to ensure that the group selection status stays in alignment with the selection status of the individual group members. This is shown in FIG. 4 as Steps 330, 340, 360, and 370. These steps contemplate that the user may individually select (or deselect) each member of the group, while the group status is set to "not selected" (or "selected", in the case of deselecting each group member). If this happens, the selection status of the group is automatically set so that it is the same as the selection status of all the group members.

If an individual object is being deselected at Steps 310 and 320 (that is, its selection status is changed to "not selected"), the test at Step 330 determines whether all the members of this object's group (including any member which is a subgroup) are now deselected: if so, then the group status will also be set to "not selected" at Step 340.

If an individual object is being selected at Steps 310 and 350 (that is, its selection status is changed to "selected"), the test at Step 360 determines whether all the members of this object's group (including any member which is a subgroup) are now selected: if so, then the group status will also be set to "selected" at Step 370.

After these status-aligning steps are performed, control transfers to Step 380 to perform additional selection status alignment checking.

Steps 380 through 390 ensure that any changes that have been made, either by selection or deselection of a group or of an individual checkbox, are reflected properly in the selection status of any larger group of which the group or checkbox is a member.

When Step 380 is reached after a group has been processed (using Steps 240 through 280), this group may have been a member of a larger group. If all other members of that larger group already had the same selection status that has just been given to this processed group, then the status of the larger group needs to be changed to indicate that all its members have the same status. For example, suppose the seven-member group and the five-member subgroup shown in FIG. 6A both had selection status "not selected", but that the individual checkboxes corresponding to "Saturday" and "Sunday" were selected. If the user has just clicked on the graphical control object for the five-member subgroup, then the subgroup selection status was changed to "selected" at Step 270, and the five individual checkboxes were set to "selected" at Step 280. Thus, all seven checkboxes are shown as selected. If the user next deselects the seven-member group by clicking on its graphical control object, he expects all seven check marks to be removed. In order for this expected behavior to occur, it is necessary to align the larger group's selection status with the selection status of all of its members.

When Step 380 is reached after a checkbox has been processed (using Steps 310 through 370), Steps 330, 340, 360, and 370 performed any necessary alignment of the group selection status for the group of which this checkbox was a member. However, that group may have actually been a subgroup of a larger group. Using the example described above from FIG. 6A, the individual checkbox for "Monday" may have been the only checkbox not yet selected. If the user clicked on this checkbox, then Step 350 set its individual selection status to "selected", and Step 370 set the subgroup selection status for the five-member group to "selected". Step 380 now needs to recognize that all members of the seven-member group are selected, and align the larger group's selection status accordingly.

In order to accomplish this alignment of selection status between a subgroup and the group of which it is a member, Step 380 asks whether the group that was just changed was in fact a subgroup of some larger group. If not, there is no alignment to be done, and control transfers back to Step 220 to await the user's next graphical object choice.

Control transfers to Step 385 when the group just changed was a subgroup. Step 385 asks whether all members of the larger group now have the same selection status. If not, then the larger group's selection status must remain as it was, and control transfers to Step 220. Otherwise, Step 390 sets the selection status of the larger group to the same status all its group members have (that is, either "selected" or "not selected", as appropriate). Control then transfers back to Step 220.

Control reaches Step 400 when a graphical object other than a new graphical control object or checkbox has been clicked on. Step 400 asks if the user has clicked on a slider bar defined according to the present invention. If so, control transfers to the process shown in FIG. 5. Otherwise, Step 450 asks if the user has chosen to "Exit" the software application. The user may choose this action in any number of ways, for example by clicking on a graphical object corresponding to an Exit function (or, alternatively, a "Quit" function), or by pressing a specially-defined key, etc. No special processing for ending the software application is defined for the present invention: the Exit processing has been shown for completeness, and to indicate how the process of FIG. 4 terminates.

If the test at Step 450 is negative, then the user clicked on a graphical object that is not pertinent to the present invention. It will be processed using techniques well known in the art, and which are not shown in FIG. 4.

An optional feature of the preferred embodiment changes the face of the graphical control object for the group to reflect the current selection state. When this feature is implemented, additional logic must be added to the processing discussed above, to redisplay the graphical control object each time the selection status for a group changes. This additional logic is required at Steps 250 and 340 (where the graphical control object is redisplayed with a check mark), at Steps 270 and 370 (redisplaying without a check mark), and at Step 390 (where the graphical control object for the larger group is redisplayed with or without a check mark, as appropriate). If there are any subgroups associated with the groups at Step 250 or Step 270, then the face of the graphical control objects for the subgroups is changed in the same manner.

FIG. 5 illustrates the logical steps performed when the user has clicked on some aspect of a slider bar defined according to the present invention. (This choice was indicated by a positive response at Step 400 of FIG. 4.) These steps provide the same advantages as the steps in FIG. 4, but with a different type of graphical control object. As discussed earlier, logical groups are not predefined for slider bar control objects: the group members are defined dynamically, as the user drags the slider or clicks on a hairline.

Step 500 asks if the user is dragging the slider along the slider bar. If so, then processing continues at Step 510; otherwise, processing continues at Step 540.

At Step 510, a test is made to determine whether the user in which direction the user is dragging the slider. As stated earlier, one of the attributes defined for a slider bar control object is the direction that corresponds to checkbox selection. If the slider is being dragged in this selecting direction, control transfers to Step 520; otherwise, control transfers to Step 530.

Step 520 is reached when the user is dragging the slider in the "selection" direction. The individual selection status of all objects located from the slider's default starting position, up through and including the object located at the position where the dragging operation stopped, is set to "selected". This dragging operation has created a temporary logical group of items. As an example, in FIG. 6G the user dragged the slider from underneath the object designated "Monday", up through and including the object designated "Friday". Therefore, the dynamically-created temporary group consists of the five objects from the range "Monday" through "Friday". The group is created temporarily in order to assign a selection status to the group members, after which there is no need to remember which objects were in the group: if the user wants to toggle the selection status of the exact same objects, he simply drags the slider underneath those objects, in the opposite direction. By defining logical groups dynamically, the user is able to change the selection status of any number of sequentially-aligned objects with a single drag-while-selecting (that is, dragging the slider while pressing the selection button appropriate to the pointing mechanism) operation.

In an optional feature of the preferred embodiment, the dynamic group concept is also used to determine whether the slider is in the correct position. Additional logic at Step 520 compares the selection status of the checkboxes positioned after (that is, in the "selection" direction) the position where the user stopped the dragging operation for selecting checkboxes. If there is one or more checkbox after the position of the slider, all being "selected", then the group of selected checkboxes can be effectively extended. This extension is accomplished by moving the slider automatically, to the end of the extended group of selected checkboxes.

Following Step 520, processing of the dragging operation is complete, and control transfers to Step 220 in FIG. 4.

Step 530 is reached when the user is dragging the slider in the opposite of the "selection" direction. The individual selection status of all objects located from where the dragging operation began, up through and including the object located at the position where the dragging operation stopped, is set to "not selected".

If the optional feature that dynamically determines whether the slider is in the correct position is implemented, additional logic at Step 530 compares the selection status of the checkboxes positioned before (that is, in the "deselection" direction) the position where the user stopped the dragging operation for deselecting checkboxes. If there is one or more checkbox before the position of the slider, all being "not selected", then the group of deselected checkboxes can be effectively extended. This extension is accomplished by moving the slider automatically, to the beginning of the extended group of deselected checkboxes.

Following Step 530, processing of the dragging operation is complete, and control transfers to Step 220 in FIG. 4.

Step 540 is reached when the user was doing something with the slider bar other than dragging the slider. Step 540 asks if the user clicked on a checkbox. If so, then control transfers to Step 550; otherwise, control transfers to Step 600.

Step 550 asks if the individual selection status for this checkbox was "selected". If the answer is positive, then the selection status will be toggled to "not selected" at Step 560; otherwise, the status was "not selected" and will be toggled to "selected" at Step 570. The position of the slider on the bar is unchanged by these steps. Following either Step 560 or Step 570, control continues to Step 580.

Step 580 performs alignment checking, similar to that used in FIG. 4 to ensure that the group selection status remained in alignment with the status of the group members. At Step 580, an optional feature of the present invention compares the new selection status of this checkbox to the selection status of the group located before it (i.e. representing all objects between this checkbox and the default starting position of the slider), and to the selection status of the group located after it (to the end of the slider range). If the selection status of the checkbox is the same as that of the group before it, and is the opposite of the group after it, then the checkbox effectively becomes a member of the first dynamic group (all members being selected), and Step 590 moves the slider to indicate that the checkbox is part of the "selected" group. If the selection status is the opposite of the group before it, and the same as the group after it, then the checkbox becomes a member of the second dynamic group (all members being deselected), and Step 590 moves the slider to indicate that the checkbox is part of the "not selected" group. If either the group before the checkbox, or the group after the checkbox, has a mixed status, then the slider is not moved. Regardless of whether the slider is moved or not, control now returns to Step 220 of FIG. 4.

Control reaches Step 600 when the user action was not dragging the slider or clicking on a checkbox. Step 600 asks if the user clicked on a hairline of the slider bar. If not, then the user's choice is not pertinent to the present invention: it will be processed using techniques known in the art, after which control returns to Step 220 of FIG. 4. If the user did click on a hairline, processing continues at Step 610.

At Step 610, the slider is moved automatically to the hairline clicked on by the user. Step 610 creates a dynamic group of checkboxes between the default slider position and this hairline position, and sets the selection status of all checkboxes in this group to "selected". Further, if the hairline is located before the position where the slider had been previously (that is, the user moved in the "deselection" direction to reach this hairline), then a second dynamic group is created. The members of this second dynamic group are the checkboxes located between where the slider had been, and up to but not including the checkbox associated with the hairline. The selection status of all checkboxes in this second group is set to "not selected". Control then returns to Step 220 of FIG. 4.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. In a computing environment, a computer program comprising a computer readable medium having computer readable code for implementing a fast and efficient technique for selecting or deselecting multiple graphical objects with a single operation while preserving an ability to select or deselect individual graphical objects, said computer readable code comprising:

a subprocess for identifying a group of graphical objects, said group having a plurality of individual graphical objects as members;

a subprocess for identifying at least one subgroup of graphical objects, each of said subgroups being a proper subset of said group or a proper subset of another subgroup;

a subprocess for associating a graphical control object with each of said subgroups;

a subprocess for displaying said group on a display screen;

a subprocess for displaying said associated graphical control objects on said display screen, such that each of said graphical control objects is displayed in a spatial relationship with its associated subgroup and such that said association between said graphical control object and said associated subgroup is visually apparent to a user of said computer readable code;

a first subprocess for enabling a user of said computer readable code to select or deselect a particular one of said graphical control objects;

a subprocess for setting a selection status of said graphical objects in said subgroup associated with said particular graphical control object, responsive to operation of said first subprocess;

a second subprocess for enabling said user to select or deselect a particular one of said individual graphical objects; and a subprocess for toggling an object selection status of said particular individual graphical object, responsive to operation of said second subprocess.

2. The computer program according to claim 1, further comprising a subgroup selection status associated with each of said subgroups.

3. The computer program according to claim 2, wherein said subprocess for setting further comprises:

a subprocess for toggling said subgroup selection status when said user selects or deselects said particular graphical control object, and a subprocess for setting said object selection status to correspond to said subgroup selection status for each of said individual graphical objects which are members of said group associated with said particular graphical control object.

4. The computer program according to claim 3, wherein said subprocess for toggling said object selection status further comprises:

a subprocess for determining whether said subgroup selection status is out of alignment with said object selection status of all of said subgroup members, and toggling said subgroup selection status to bring it into alignment when necessary.

5. The computer program according to claim 3, wherein: said subprocess for toggling said subgroup selection status further comprises:

a subprocess for determining whether said subgroup associated with said particular graphical control object is one of said proper subsets of another subgroup; and a subprocess for maintaining alignment between said subgroup selection status of said subgroup associated with said particular graphical control object and said subgroup selection status of said other subgroup if said subprocess for determining has a positive result.

6. The computer program according to claim 2, claim 3, claim 4, or claim 5, wherein said particular graphical control object is a check bar.

7. The computer program according to claim 6, wherein said check bar includes a visual indication of an effect of selecting or deselecting said check bar, and wherein said visual indication is changed when said subgroup selection status of said subgroup associated with said check bar is changed.

8. The computer program according to claim 2, claim 3, claim 4, or claim 5, wherein said particular graphical control object has a geometric shape capable of visibly indicating which of said individual graphical objects are members of said associated subgroup.

9. The computer program according to claim 8, wherein said geometric shape has an additional graphical object contained within it, and wherein said first subprocess for enabling said user to select or deselect comprises enabling said user to select said additional graphical object.

10. In a computing environment, a computer program comprising a computer readable medium having computer readable code for implementing a fast and efficient technique for selecting or deselecting multiple graphical objects with a single operation while preserving an ability to select or deselect individual graphical objects said computer readable code comprising:

a subprocess for providing a group of graphical objects, said group having a plurality of individual graphical objects as members and each of said individual graphical objects having an object selection status;

a subprocess for displaying said group on a display screen;

a subprocess for displaying a graphical slider object on said display screen in a spatial relationship with said group, such that an association between said graphical slider object and said group is visually apparent to a user of said computer readable code;

a first subprocess for enabling said user to drag a slider on said slider object;

a second subprocess for enabling said user to click on a hairline displayed on said slider object;

a third subprocess for enabling said user to select or deselect a particular one of said individual graphical objects;

a subprocess for toggling said object selection status of said particular one, responsive to operation of said third subprocess;

a subprocess for setting, responsive to operation of said first subprocess, said object selection status of each member of a first dynamically-created group of individual graphical objects to a selected state when said user is dragging said slider in a direction corresponding to selection, wherein said members of said first group comprise all of said objects located between a default position of said slider and a last object to which said user dragged said slider;

a subprocess for setting, responsive to operation of said first subprocess, said object selection status of each member of a second dynamically-created group to a not-selected state when said user is dragging said slider in an opposite direction of said direction corresponding to selection, wherein said members of said second group comprise all of said objects located between a first prior position and a new position to which said user dragged said slider; and a subprocess, responsive to operation of said second subprocess, wherein said subprocess comprises moving said slider to a position of said hairline, setting said object selection status of each member of a third dynamically-created group of individual graphical objects to said selected state, wherein said members of said third group comprise all of said objects located between said default position of said slider and said position of said hairline, and if moving said slider from a second prior position to said position of said hairline moves said slider in said opposite direction, then setting said object selection status of each member of a fourth dynamically-created group of individual graphical objects to said not-selected state, wherein said members of said fourth group comprise all of said objects located between said second prior position and up to but not including said object located at said position of said hairline.

11. The computer program according to claim 10, wherein:

said subprocess for setting said object selection status of each member of said first group further comprises extending said first group automatically to include any other members located between said last position and a first extended position in said direction corresponding to selection, wherein all of said any other members have said object selection status set to said selected state, and automatically moving said slider to said first extended position; and said subprocess for setting said object selection status of each member of said second group further comprises extending said second group automatically to include any other members located between said new position and a second extended position in said opposite direction, wherein all of said any other members have said object selection status set to said not-selected state, and automatically moving said slider to said second extended position.

12. The computer program according to claim 10 or claim 11, wherein said subprocess for toggling said object selection status further comprises:

a subprocess for forming a first temporary group of individual graphical objects, comprised of all objects located between said default slider position and a first position before a position of said selected or deselected individual graphical object;

a subprocess for forming a second temporary group of individual graphical objects, comprised of all objects located after said position of said selected or deselected individual graphical object; and a subprocess for moving said slider when all of said objects in said first temporary group are in said selected state and all of said objects in said second temporary group are in said not-selected state, comprising: moving said slider to said position of said individual object when said individual object was selected by said user, and moving said slider to said first position when said individual object was deselected by said user.

13. A system for implementing a fast and efficient technique for selecting or deselecting multiple graphical objects with a single operation while preserving an ability to select or deselect individual graphical objects, said system comprising:

means for identifying a group of graphical objects, said group having a plurality of individual graphical objects as members;

means for identifying at least one subgroup of graphical objects, each of said subgroups being a proper subset of said group or a proper subset of another subgroup;

means for associating a graphical control object with each of said subgroups;

means for displaying said group on a display screen;

means for displaying said associated graphical control objects on said display screen, such that each of said graphical control objects is displayed in a spatial relationship with its associated subgroup and such that said association between said graphical control object and said associated subgroup is visually apparent to a user of said system;

first means for enabling a user of said system to select or deselect a particular one of said graphical control objects;

means for setting a selection status of said graphical objects in said subgroup associated with said particular graphical control object, responsive to operation of said first means;

second means for enabling said user to select or deselect a particular one of said individual graphical objects; and means for toggling an object selection status of said particular individual graphical object; responsive to operation of said second means.

14. The system according to claim 13, further comprising a subgroup selection status associated with each of said subgroups.

15. The system according to claim 14, wherein said means for setting further comprises:

means for toggling said subgroup selection status when said user selects or deselects said particular graphical control object; and means for setting said object selection status to correspond to said subgroup selection status for each of said individual graphical objects which are members of said subgroup associated with said particular graphical control object.

16. The system according to claim 15, wherein said means for toggling said object selection status further comprises:

means for determining whether said subgroup selection status is out of alignment with said object selection status of all of said subgroup members, and toggling said subgroup selection status to bring it into alignment when necessary.

17. The system according to claim 15, wherein:

said means for toggling said subgroup selection status further comprises:

means for determining whether said subgroup associated with said particular graphical control object is one of said proper subsets of another subgroup; and means for maintaining alignment between said group selection status of said subgroup associated with said particular graphical control object and said subgroup selection status of said other subgroup if said means for determining has a positive result.

18. The system according to claim 14, claim 15, claim 16, or claim 17, wherein said particular graphical control object is a check bar.

19. The system according to claim 18, wherein said check bar includes a visual indication of an effect of selecting or deselecting said check bar, and wherein said visual indication is changed when said subgroup selection status of said subgroup associated with said check bar is changed.

20. The system according to claim 14, claim 15, claim 16, or claim 17, wherein said particular graphical control object has a geometric shape capable of visibly indicating which of said individual graphical objects are members of said associated subgroup.

21. The system according to claim 20, wherein said geometric shape has an additional graphical object contained within it, and wherein said first means for enabling said user to select or deselect comprises enabling said user to select said additional graphical object.

22. A system for implementing a fast and efficient technique for selecting or deselecting multiple graphical objects with a single operation while preserving an ability to select or deselect individual graphical objects, said system comprising:

means for providing a group of graphical objects, said group having a plurality of individual graphical objects as members and each of said individual graphical objects having an object selection status;

means for displaying said group on a display screen;

means for displaying a graphical slider object on said display screen in a spatial relationship with said group, such that an association between said graphical slider object and said group is visually apparent to a user of said computer readable code;

first means for enabling said user to drag a slider on said slider object;

second means for enabling said user to click on a hairline displayed on said slider object;

third means for enabling said user to select or deselect a particular one of said individual graphical objects;

means for toggling said object selection status of said particular one, responsive to operating of said third means;

means for setting, responsive to operation of said first means, said object selection status of each member of a first dynamically-created group of individual graphical objects to a selected state when said user is dragging said slider in a direction corresponding to selection, wherein said members of said first group comprise all of said objects located between a default position of said slider and a last object to which said user dragged said slider;

means for setting, responsive to operation of said first means, said object selection status of each member of a second dynamically-created group to a not-selected state when said user is dragging said slider in an opposite direction of said direction corresponding to selection, wherein said members of said second group comprise all of said objects located between a first prior position and a new position to which said user dragged said slider; and means, responsive to operation of said second means, wherein said means comprises moving said slider to a position of said hairline, setting said object selection status of each member of a third dynamically-created group of individual graphical objects to said selected state, wherein said members of said third group comprise all of said objects located between said default position of said slider and said position of said hairline, and if moving said slider from a second prior position to said position of said hairline moves said slider in said opposite direction, then setting said object selection status of each member of a fourth dynamically-created group of individual graphical objects to said not-selected state, wherein said members of said fourth group comprise all of said objects located between said second prior position and up to but not including said object located at said position of said hairline.

23. The system according to claim 22, wherein:

said means for setting said object selection status of each member of said first group further comprises extending said first group automatically to include any other members located between said last position and a first extended position in said direction corresponding to selection, wherein all of said any other members have said object selection status set to said selected state, and automatically moving said slider to said first extended position; and said means for setting said object selection status of each member of said second group further comprises extending said second group automatically to include any other members located between said new position and a second extended position in said opposite direction, wherein all of said any other members have said object selection status set to said not-selected state, and automatically moving said slider to said second extended position.

24. The system according to claim 22 or claim 23, wherein said means for toggling said object selection status further comprises:

means for forming a first temporary group of individual graphical objects, comprised of all objects located between said default slider position and a first position before a position of said selected or deselected individual graphical object;

means for forming a second temporary group of individual graphical objects, comprised of all objects located after said position of said selected or deselected individual graphical object; and means for moving said slider when all of said objects in said first temporary group are in said selected state and all of said objects in said second temporary group are in said not-selected state, comprising: moving said slider to said position of said individual object when said individual object was selected by said user, and moving said slider to said first position when said individual object was deselected by said user.

25. A method of implementing a fast and efficient technique for selecting or deselecting multiple graphical objects with a single operation while preserving an ability to select or deselect individual graphical objects, said method comprising the steps of:

identifying a group of graphical objects, said group having a plurality of individual graphical objects as members;

identifying at least one subgroup of graphical objects, each of said subgroups being a proper subset of said group or a proper subset of another subgroup;

associating a graphical control object with each of said subgroups;

displaying said group on a display screen;

displaying said associated graphical control objects on said display screen, such that each of said graphical control objects is displayed in a spatial relationship with its associated subgroup and such that said association between said graphical control object and said associated subgroup is visually apparent to a user of said method;

a first step of enabling a user of said method to select or deselect a particular one of said graphical control objects;

setting a selection status of said graphical objects in said subgroup associated with said particular graphical control object, responsive to operation of said first step of enabling;

a second step of enabling said user to select or deselect a particular one of said individual graphical objects; and toggling an object selection status of said particular individual graphical object, responsive to operation of said second step of enabling.

26. The method according to claim 25, further comprising a subgroup selection status associated with each of said subgroups.

27. The method according to claim 26, wherein said step of setting further comprises the steps of:

toggling said subgroup selection status when said user selects or deselects said particular graphical control object; and setting said object selection status to correspond to said subgroup selection status for each of said individual graphical objects which are members of said subgroup associated with said particular graphical control object.

28. The method according to claim 27, wherein said step of toggling said object selection status further comprises the step of:

determining whether said subgroup selection status is out of alignment with said object selection status of all of said subgroup members, and toggling said subgroup selection status to bring it into alignment when necessary.

29. The method according to claim 27, wherein:

said step of toggling said subgroup selection status further comprises the steps of:

determining whether said subgroup associated with said particular graphical control object is one of said proper subsets of another subgroup; and maintaining alignment between said subgroup selection status of said subgroup associated with said particular graphical control object and said subgroup selection status of said other subgroup if said determining step has a positive result.

30. The method according to claim 26, claim 27, claim 28, or claim 29, wherein said particular graphical control object is a check bar.

31. The method according to claim 30, wherein said check bar includes a visual indication of an effect of selecting or deselecting said check bar, and wherein said visual indication is changed when said subgroup selection status of said subgroup associated with said check bar is changed.

32. The method according to claim 26, claim 27, claim 28, or claim 29, wherein said particular graphical control object has a geometric shape capable of visibly indicating which of said individual graphical objects are members of said associated subgroup.

33. The method according to claim 32, wherein said geometric shape has an additional graphical object contained within it, and wherein said first step of enabling said user to select or deselect comprises enabling said user to select said additional graphical object.

34. A method for implementing a fast and efficient technique for selecting or deselecting multiple graphical objects with a single operation while preserving an ability to select or deselect individual graphical objects, said method comprising the steps of:

providing a group of graphical objects, said group having a plurality of individual graphical objects as members and each of said individual graphical objects having an object selection status;

displaying said group on a display screen;

displaying a graphical slider object on said display screen in a spatial relationship with said group, such that an association between said graphical slider object and said group is visually apparent to a user of said method;

a first step of enabling said user to drag a slider on said slider object;

a second step of enabling said user to click on a hairline displayed on said slider object;

a third step of enabling said user to select or deselect a particular one of said individual graphical objects;

toggling said object selection status of said particular one, responsive to operation of said third step;

setting, responsive to operation of said first step, said object selection status of each member of a first dynamically-created group of individual graphical objects to a selected state when said user is dragging said slider in a direction corresponding to selection, wherein said members of said first group comprise all of said objects located between a default position of said slider and a last object to which said user dragged said slider;

setting, responsive to operation of said first step, said object selection status of each member of a second dynamically-created group to a not-selected state when said user is dragging said slider in an opposite direction of said direction corresponding to selection, wherein said members of said second group comprise all of said objects located between a first prior position and a new position to which said user dragged said slider; and a step, responsive to operation of said second step, wherein said step comprises moving said slider to a position of said hairline, setting said object selection status of each member of a third dynamically-created group of individual graphical objects to said selected state, wherein said members of said third group comprise all of said objects located between said default position of said slider and said position of said hairline, and if moving said slider from a second prior position to said position of said hairline moves said slider in said opposite direction, then setting said object selection status of each member of a fourth dynamically-created group of individual graphical objects to said not-selected state, wherein said members of said fourth group comprise all of said objects located between said second prior position and up to but not including said object located at said position of said hairline.

35. The method according to claim 34, wherein:

said step of setting said object selection status of each member of said first group further comprises extending said first group automatically to include any other members located between said last position and a first extended position in said direction corresponding to selection, wherein all of said any other members have said object selection status set to said selected state, and automatically moving said slider to said first extended position; and said step of setting said object selection status of each member of said second group further comprises extending said second group automatically to include any other members located between said new position and a second extended position in said opposite direction, wherein all of said any other members have said object selection status set to said not-selected state, and automatically moving said slider to said second extended position.

36. The method according to claim 34 or claim 35, wherein said step of toggling said object selection status further comprises the steps of:

forming a first temporary group of individual graphical objects, comprised of all objects located between said default slider position and a first position before a position of said selected or deselected individual graphical object;

forming a second temporary group of individual graphical objects, comprised of all objects located after said position of said selected or deselected individual graphical object; and moving said slider when all of said objects in said first temporary group are in said selected state and all of said objects in said second temporary group are in said not-selected state, said movement comprising: moving said slider to said position of said individual object when said individual object was selected by said user, and moving said slider to said first position when said individual object was deselected by said user.

* * * * *